United States Patent Office 2,775,547
Patented Dec. 25, 1956

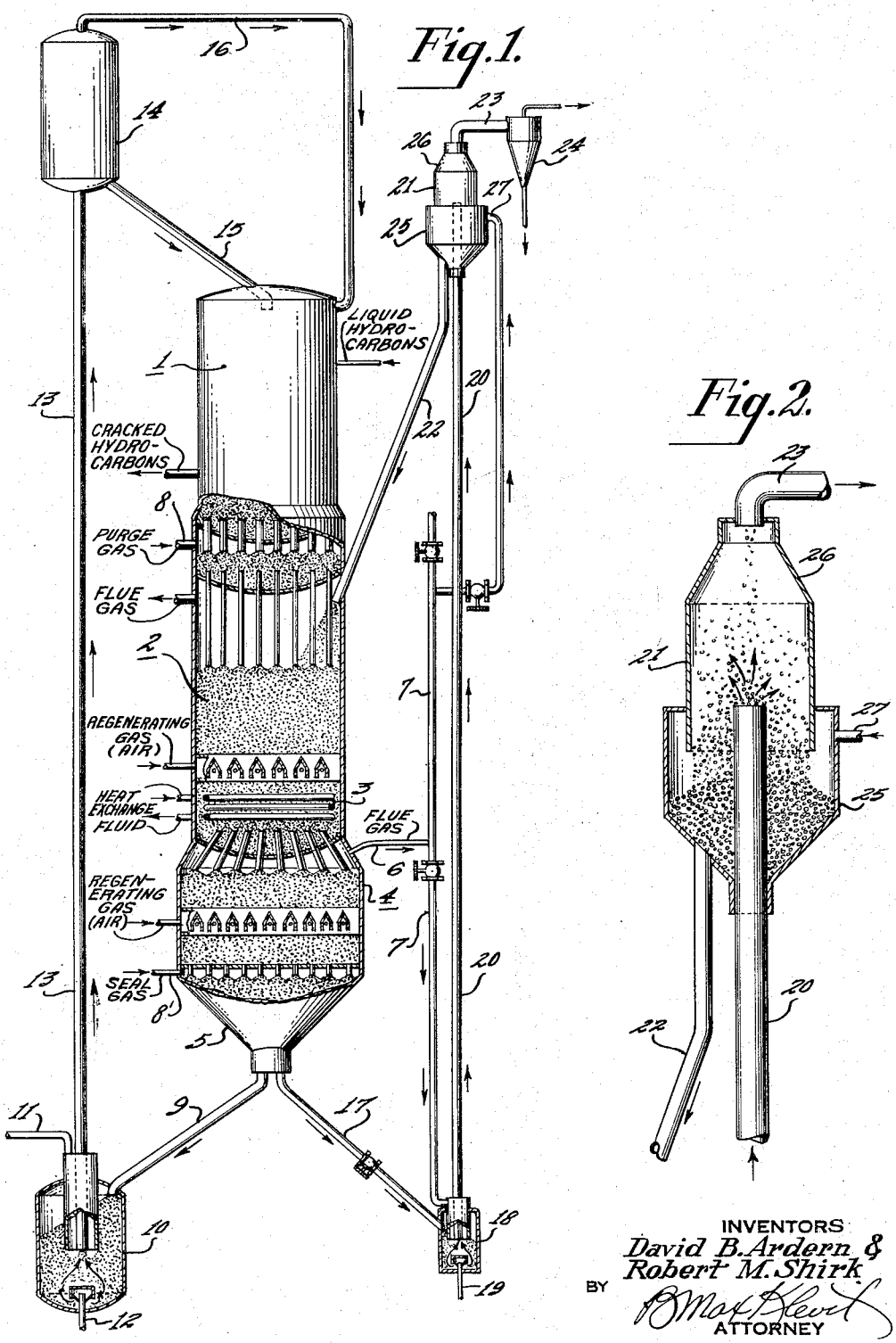

2,775,547

HYDROCARBON LIFT SYSTEM FOR THE CONVERSION OF HYDROCARBONS AND THE SEPARATION OF FINES

David B. Ardern, Moylan, Pa., and Robert M. Shirk, Wilmington, Del., assignors to Houdry Process Corporation, Wilmington, Del., a corporation of Delaware Application May 3, 1951, Serial No. 224,324

7 Claims. (Cl. 196—52)

This invention relates to the conversion of hydrocarbons wherein granular catalyst is circulated continuously through reaction vessels in compact solid beds and particularly to the removal of dust and very small particles which are produced by attrition.

At present, one commercially successful method of cracking hydrocarbons includes continuously recycling the catalyst in such manner that it is initially contacted with the hydrocarbons under cracking conditions followed by a regeneration step wherein coke accumulated thereon during cracking is removed. One means for recycling the catalyst comprises a mechanical elevator, the catalyst being supplied after regeneration to the bottom of the elevator and permitted to flow by gravity through the reactor from the top of the elevator. A more recent development in elevating the catalyst from the regenerator to a higher point in the system for subsequent gravitational flow has been the employment of a gas lift elevator. In an elevator of this type, the catalyst particles are engaged with a vertically moving stream of gas which is of a sufficient velocity and pressure to convey the catalyst particles to the desired height. At the top of the gas lift there is generally provided a disengaging chamber for separating the gas and the catalyst particles, the former being discharged from the system and the catalyst particles allowed to flow by gravity to the reactor.

Recently, it has been found practical in systems using the gas lift to employ, as the elevating medium, gaseous hydrocarbons which, after performing their catalyst-lifting function, are separated therefrom and subsequently conveyed to the reactor vessel for cracking. One modification in connection with the use of gaseous hydrocarbons as the lifting medium has been to provide cracking conditions within the lift pipe, such that, after the catalyst has been elevated, the gaseous hydrocarbons then, in a cracked condition, can be separated from the catalyst and conveyed to subsequent treating operations.

As a result of constant circulation of the catalyst, the rubbing and impacting of catalyst upon catalyst, and of catalyst particles with equipment walls occurs. This attrition produces finer particles than the desired nominal 4 to 10 mesh catalyst, the fines ranging from the smaller desired limit, say 10 mesh, to micronsize dust. If these fines are permitted to accumulate in the circulating catalyst, the pressure drop for flow of vapors through reaction beds will increase undesirably, and at certain locations gas flowing through the catalyst bed will cause segregation and removal of dust and finer particles into outlet gas streams which should preferably be entirely free of dust. It is therefore necessary to provide means for continuously removing these fines.

In those systems for recycling the catalyst by means of an inert gas lift, removal of the fines has been accomplished by withdrawing a portion of the recycled catalyst between the gas lift disengager, and the reactor unit. Upon removal of the catalyst, the fines associated therewith are also removed, and the two can then be subsequently separated, followed by returning the catalyst of desired size to the system. However, in a process of this type, escape of inert gas during the removal of a portion of the catalyst and associated fines is immaterial, and hence no special precautions need be taken. In aforementioned processes wherein gaseous hydrocarbons are used as the lifting medium, it becomes important to prevent escape of hydrocarbons from the system, which would be the case in the above-mentioned type of method for removing fines, unless special precautions are taken such as a purging step and the use of a sealing gas before the point of withdrawal.

Accordingly, it is the primary object of this invention to provide an improved process and apparatus for removing fines from a system for cracking hydrocarbons employing a continuously recycled catalyst wherein the catalyst is elevated by a gaseous hydrocarbon.

Another object is the provision of a second gas lift elevator in systems of the above type for handling a portion of the catalyst and associated fines for subsequent separation.

Still another object is to provide a gas lift elevator for elevating a portion of catalyst and fines from the aforementioned systems employing as the gaseous elevating medium the effluent flue gas from the regeneration of the catalyst.

The foregoing and other objects will become more apparent from the accompanying drawing and following detailed discussion of the apparatus disclosed thereon and its method of operation.

Figure 1 is an elevational view, partly in section and partly broken away, of an apparatus constructed in accordance with the teachings of the present invention.

Figure 2 is an enlarged elevation, partly in section, of the elutriator device of the apparatus of Fig. 1.

Referring more particularly to the drawing and specifically to Figure 1, there is shown a reactor vessel having a cracking zone designated generally by the numeral 1 provided with appropriate means for contacting hot downwardly moving catalyst with liquid and vaporous hydrocarbons. Below the cracking zone there is shown an oxidation zone indicated by the numeral 2 wherein air or other oxidizing gas is permitted to flow countercurrent to the catalyst moving downwardly from the cracking zone to thereby remove coke accumulated on the catalyst. The catalyst passes from this oxidation zone through a cooling zone indicated at 3 and into a second oxidation zone designated generally by the numeral 4. Following the second oxidation treatment, the regenerated catalyst is permitted to flow into a discharge hopper 5.

Effluent gases from the oxidation zones may be conveyed away from the system or employed in other parts of the system as, for example, a lift medium in accordance with the teachings of the present invention. In this respect, the numeral 6 designates a pipe line through which effluent gases from the second oxidation zone are conveyed to a dispersal line 7 for either employment as a lifting medium or to assist in an elutriation operation. An inert gas may be admitted to the gravitating catalyst, as through supply lines 8 and 8', to serve as purge gas and as seal gas, respectively.

While the reactor vessel is shown broken away in order to disclose the elements contained therein, their details of construction and mode of operation as such form no part of the present invention.

Regenerated catalyst from discharge hopper 5 is conveyed by means of supply line 9 to hopper 10 for temporary storage prior to elevation. Hydrocarbons in vapor or in mixed phase condition and under suitable velocity and pressure are supplied as the lift medium to hopper 10 by means of line 11. Also contemplated as an assistant in the elevation of the catalyst is additional gas, such as hydrocarbons, steam, or other compatible gases, which may be supplied to hopper 10 by line 12 and in passing upwardly through the catalyst aid in impelling and elevating the catalyst into the lift path. The gaseous hydrocarbon stream, however introduced, picks up the catalyst particles and conveys them upwardly through lift conduit 13. As previously indicated, cracking conditions may exist during the contact between the catalyst particles and the hydrocarbons while in the lift pipe, although this is a condition which will depend on commercial desirability and other practical aspects.

Following the passage of the hydrocarbons and catalyst through conduit 13, the mixture is then discharged into separator or disengaging chamber 14 where the gaseous medium and the catalyst are separated, the catalyst being then permitted to flow by gravity to the reactor zone 1 through line 15. The separated hydrocarbons pass by means of line 16 to the reactor 1 for reaction therein.

As previously mentioned, a former process of continuously withdrawing a minor portion, such as about 5%, of the catalyst and associated fines for subsequent removal of the latter was accomplished by tapping in at line 15 in those systems using an inert gas elevating medium. However, in systems of the instant type employing hydrocarbons as the elevating medium, it is necessary to prevent loss of hydrocarbon from the system. Hence, according to one embodiment of the present invention, a minor portion of the regenerated catalyst and associated fines may be removed from the system at the discharge end of hopper 5 and is conveyed therefrom by means of line 17 to a second gas lift which is provided with a hopper 18. The gaseous medium employed for lifting the catalyst particles and associated fines in the second gas lift system is, in the preferred embodiment, flue gas from the catalyst regeneration zone and may be supplied to hopper 18 through lines 6 and 7. As previously mentioned in connection with the first gas lift system, an auxiliary gas may be admitted to hopper 13 through line 19.

The flue gas stream entering hopper 18 conveys particles of catalyst and associated fines upwardly through lift conduit 20, the mixture being discharged into an elutriator 21. In the elutriator the larger catalyst particles are separated from the flue gas and entrained fines, these larger catalyst particles being permitted to discharge, as through line 22, back to the main catalyst stream in the top of regeneration zone 2 by gravitational flow. The flue gas and entrained fines are then permitted to flow from the elutriator by means of line 23 to a cyclone separator 24 where the fines are separated from the gas.

Referring now to Figure 2 there is shown an enlarged view of the elutriator 21. This elutriator comprises a disengaging section 26 in which the larger and heavier catalyst particles are permitted to separate from an upwardly moving gas stream while the lighter particles comprising the fines remain in the gas stream and are conveyed through line 23 to a cyclone separator. The larger and heavier catalyst particles, when separated from the upwardly moving gas stream, fall by gravity into the hopper section 25 of the elutriator from which they are permitted to flow by gravity through line 22 into the regeneration section of the reactor vessel. Provision is made for introducing an elutriating gas into the hopper section 25 through inlet 27. This gas may comprise a portion of the flue gas issuing from an oxidation zone in the reactor vessel.

While there have been shown and described herein certain specific embodiments of the present invention, it will be readily understood that the invention is not to be limited exactly thereto, since various modifications may be made without departing from the scope of the invention as defined in the appended claims.

We claim:

1. In a hydrocarbon conversion process wherein a body of granular catalyst is continuously circulated through a closed system including hydrocarbon conversion and catalyst regeneration zones through each of which said catalyst gravitates as a compact moving mass, and wherein regenerated catalyst withdrawn from said regeneration zone is elevated by a stream of gaseous hydrocarbons through a confined lift path for return to said conversion zone, the method of removing catalyst fines from said circulating body of catalyst which comprises the steps of: continuously removing a minor portion of fresh regenerated catalyst from said system; engaging said minor portion of regenerated catalyst with a stream of inert lift gas; conveying said minor portion of regenerated catalyst by means of said inert lift gas upwardly through a second confined lift path to an elevated elutriation zone; passing the catalyst-conveying stream of inert lift gas through said elutriation zone at such reduced velocity that the particles of catalyst other than fines become disengaged from the gas stream and settle to the bottom of said elutriation zone; discharging said inert gas together with entrained fines from the upper end of said elutriation zone; discharging the disengaged coarser particles of catalyst from the bottom of said elutriation zone; and returning said coarser particles to said circulating body of catalyst.

2. A process as in claim 1 in which said inert lift gas comprises flue gas obtained from said regeneration zone.

3. A process as in claim 1 in which said hydrocarbon conversion is carried out under cracking conditions.

4. A process as in claim 1 wherein said minor portion of catalyst is conveyed by said second lift to a level above said regeneration zone and said coarser particles of elutriated catalyst are returned to said circulating body of catalyst by being passed as a confined gravitating stream directly to said regeneration zone.

5. A process as in claim 1 including the step of adding additional inert gas into said elutriating zone to supplement said inert lift gas in conveying said entrained fines from the upper end of said elutriating zone.

6. In hydrocarbon conversion apparatus having a closed system for circulating a main body of granular catalyst, which system comprises a reactor, a regenerator, a main gas lift pipe for transferring fresh regenerated catalyst from the bottom of said regenerator to the top of said reactor, means for introducing gaseous hydrocarbons to the lower end of said lift pipe so as to convey said catalyst therethrough, and means for passing hydrocarbon-contacted catalyst and gaseous hydrocarbons from the top of said main lift pipe to said reactor, the combination therewith of a secondary lift pipe, means for passing a minor portion of fresh regenerated catalyst from said regenerator to said secondary lift pipe, means for engaging said minor portion of regenerated catalyst with inert lift gas to convey the same through said secondary lift pipe, an elutriator vessel at the upper end of said secondary lift pipe adapted to receive the discharging stream of regenerated catalyst and inert lift gas and to lower the velocity thereof sufficiently to disengage the coarser particles of said catalyst, means for discharging said inert gas together with entrained fines from said elutriator, and means for passing the disengaged coarser particles of catalyst from said elutriator to said main body of circulating catalyst.

7. Apparatus as in claim 6 including means for introducing additional inert gas into said elutriator vessel to supplement said inert lift gas in conveying said fines out of said vessel.

References Cited in the file of this patent
UNITED STATES PATENTS

| | | |
|---|---|---|
| 2,483,485 | Barr | Oct. 4, 1949 |
| 2,494,794 | Bonnell | Jan. 17, 1950 |
| 2,531,192 | Bergstrom | Nov. 21, 1950 |
| 2,546,625 | Bergstrom | Mar. 27, 1951 |
| 2,561,771 | Ardern | July 24, 1951 |
| 2,618,588 | Jahnig | Nov. 18, 1952 |
| 2,666,731 | Bergstrom | Jan. 19, 1954 |

OTHER REFERENCES

"Houdriflow," New Design in Catalytic Cracking, Oil and Gas Journal, January 13, 1949, pages 78–79.